US007864632B2

(12) United States Patent
Pfaffinger

(10) Patent No.: US 7,864,632 B2
(45) Date of Patent: Jan. 4, 2011

(54) HEADTRACKING SYSTEM

(75) Inventor: Gerhard Pfaffinger, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 367 days.

(21) Appl. No.: 11/948,494

(22) Filed: Nov. 30, 2007

(65) Prior Publication Data

US 2008/0130408 A1 Jun. 5, 2008

(30) Foreign Application Priority Data

Nov. 30, 2006 (EP) .................................. 06024814

(51) Int. Cl.
*G01S 3/80* (2006.01)

(52) U.S. Cl. ...................................................... 367/124

(58) Field of Classification Search .......... 367/121–190
See application file for complete search history.

(56) References Cited

U.S. PATENT DOCUMENTS

| | | | | |
|---|---|---|---|---|
| 5,163,013 | A * | 11/1992 | Herzer et al. | 702/171 |
| 5,495,427 | A * | 2/1996 | Puma et al. | 367/117 |
| 6,477,255 | B1 | 11/2002 | Yoshida et al. | 381/86 |
| 6,556,942 | B1 * | 4/2003 | Smith | 702/150 |
| 2004/0190730 | A1 | 9/2004 | Rui et al. | 381/92 |
| 2005/0226437 | A1 * | 10/2005 | Pellegrini et al. | 381/77 |

FOREIGN PATENT DOCUMENTS

| | | | |
|---|---|---|---|
| JP | 04094295 | 3/1992 | 5/27 |

OTHER PUBLICATIONS

M. Schlang, "Ein Verfahren Zur Automatischen Ermittlung Der Sprecherposition Bei Freisprechen," ITG-Fachbericht 105, pp. 69-73, 1989.

Mackensen et al., "Einfluss der spontanen Kopfdrehungen auf die Lokalisation beim binauralen Hören [The Impact of Spontaneous Head Movements on the Localization in Binaural Hearing]", 20. Tonmeistertagung Karlsruhe, Tagungsband 218-228.

M. Schlang, "Method for Automatically Determining the Speaker's Position in Hands-Free Speaking," ITG-Fachbericht 105, pp. 69-73, 1989.

Mackensen et al., "Effect of Spontaneous Head Rotations on Localization in Binaural Hearing [The Impact of Spontaneous Head Movements on the Localization in Binaural Hearing]", 20. Tonmeistertagung Karlsruhe, Tagungsband 218-228.

Verifications of Translation.

Knapp et al.: "The Generalized Correlation Method for Estimation of Time Delay", IEEE Transactions on Acoustics, Speech and Signal Processing, vol. ASSP-24, No. 4, Aug. 1976, pp. 320-327.

* cited by examiner

*Primary Examiner*—Thomas H Tarcza
*Assistant Examiner*—Luke D Ratcliffe
(74) *Attorney, Agent, or Firm*—O'Shea Getz P.C.

(57) ABSTRACT

System and method for tracking of a head comprising generating and radiating at least one acoustical test signal; receiving the radiated acoustical test signal(s) at two locations at the head under investigation and generating electrical measurement signals therefrom; and evaluating the two measurement signals for determining the position and/or angle of rotation $\phi$ from the measurement signals; the evaluation step comprises a cross power spectrum operation of the test signal(s) and the signals from the receivers in the frequency domain.

32 Claims, 5 Drawing Sheets

HEADTRACKING SYSTEM

CLAIM OF PRIORITY

This patent application claims priority to European Patent Application serial number 06 024 814.3 filed on Nov. 30, 2006.

FIELD OF THE INVENTION

The invention relates to tracking of a human head and, in particular, determining the position and/or the angle of rotation of a human head in a sonic field.

RELATED ART

In many applications it is desirable to assess the propagation time of acoustic signals for the purpose of recording the changeable spatial position and rotation of objects, particularly tracking of head positions and movements relative to the sonic field of an audio signal presentation through loudspeakers in spaces such as, for example, the passenger compartment of an automobile. The delay time measurement of an acoustic signal makes use of the fact that an impulse-shaped sonic signal is integrated by a transmitting converter into the measurement medium, and detected after crossing the measurement path by a reception converter. The sonic propagation time is the difference in time between the transmission process and the reception of the sonic signal at the reception point. When recording the head positions and movements using this measurement method, a suitable circuit for following these movements is known as a headtracker.

It is known that headtrackers are also used as a substitute for a computer mouse for persons with motor disabilities and in virtual reality applications in which the wearing of virtual reality glasses is not wanted. In addition, headtrackers are used in the operation of computers without any mouse or keyboard at all by voice control and in surround sound applications.

For headtrackers, or the determination of the position of the head, different methods are implemented. For example, external sensors not subject to head movement are used to track the position and direction of reference sources that are fastened to the moveable object and transmit a corresponding test signal. The moveable object can be the head itself or an arrangement firmly connected to the head. Optical, acoustic or electromagnetic sensors are used in this arrangement.

Using a different method, movement-tracking sensors attached to a moving object are employed to trace the position of fixed external reference points. Optical, acoustic or electromagnetic sensors are again used in this arrangement.

For the sake of completeness, it should be noted that methods with mechanical systems are also used for headtrackers in which angle sensors measure the deviation of lever arms attached to the moveable object. It is evident that this latter method is unsuitable for applications in which free movement is required.

To achieve a wide acceptance of headtrackers it is necessary that they function under many different environmental conditions without being affected by disturbances or noise and that they do not restrict the natural area of movement. Moreover, headtrackers should be able to be worn with comfort and unobtrusively, and should be available at an affordable price.

More and more modern automobiles are offering so-called rear seat entertainment, which includes high-quality audio signal performance. The option of audio focusing on individual persons is also required, which is usually realized by providing the signals through headphones.

A considerable disadvantage of the relaying of audio signals, for example, music through headphones is that so-called "in-head localization" occurs. Whereas in the case of audio transmission through loudspeakers with two equally loud and coherent audio signals, an acoustic source can be perceived to be located between the loudspeakers, the transmission of the same signals through headphones results in in-head localization. Two similarly loud, coherent audio signals are localized and perceived at the same point in space, which is located in the middle between both ears. Changes in intensity and propagation time shift the location of the audio perception along a path between the ears.

Moreover, the audio signals are always perceived as coming from the same direction and with the same audio characteristics regardless of the position of the head—for example, a rotational movement. The audio characteristics (e.g., sonic level, reflections, echoes and propagation time differences between the left and right ears) vary in a real sonic field according to the current position of the head in the sonic field itself. For example, changes in the sonic level measuring greater than 2 dB due to a change in position of the head in the sonic field result in a tangible shift in the location of the audible perception.

This means that the use of headphones causes a loss of the effect of the so-called acoustic stage reproduction as experienced when moving the head in a room in which the signals are relayed, e.g., through loudspeakers.

Methods for creating a virtual auditive environment using room-acoustic synthesis are therefore gaining in importance both in the consumer sector as well as for professional applications. The function of these so-called auralization methods is to create an artificial auditive environment for the listener that, for example, mirrors the apparent presence in a real signal-reflecting room.

The key parameters for the spatial-acoustic perception are the Interaural Time Difference (ITD), the Interaural Intensity Difference (IID) and the Head-Related Transfer Function (HRTF). The ITD is derived from differences in propagation times between the left and right ears for an audio signal received from the side, and can have values of typically up to 0.7 milliseconds. For a sonic speed of 343 m/s, this corresponds to a difference of about 24 cm on the path of an acoustic signal, and therefore to the anatomical characteristics of a human listener. The listener's hearing analyzes the psychoacoustic effect of the law of reception of the first wavefront. At the same time, it can be seen that the sonic pressure is lower (IID) at the ear that is further away from the side of the head on which the audio signal is received.

It is also known that the human outer ear is shaped in such a way that it represents a transfer function for audio signals received in the auditory canal. The outer ear therefore exhibits a characteristic frequency and phase response for a given angle of reception of an audio signal. This characteristic transfer function is convolved with the soundwave received in the auditory canal and contributes significantly to the ability to hear sound spatially. In addition, a soundwave reaching the human ear is also altered by further influences due to the ear's surroundings—i.e., the anatomy of the body.

The soundwave reaching the human ear is already altered on the path to the ear not only by the general acoustic properties of the room, but also by concealment of the head or reflections at the shoulders or body. The characteristic transfer function that factors in all these effects is known as the Head-Related Transfer Function (HRTF) and describes the frequency dependence of the sonic transfer. HRTFs therefore describe the physical characteristics used by the auditory system to localize and perceive acoustic sources. There also exists a dependency between the horizontal and vertical angles of the reception of the audio signals.

To create a virtual auditive environment with headphone operation using acoustic room synthesis, databases of transfer functions for the left and right outer ears—HRTF(L, R) respectively—determined in a low reflection environment are referred to. Depending on the angle of reception of an audio signal, the frequency-dependent sonic pressure characteristics are measured both for the left and right ears of an artificial head or person, and then cataloged and saved in a database. Using typical room simulation software, angles and propagation times of received discrete reflections can be analyzed.

Depending on the position of the head, appropriate HRTF pairs and also the parameters ITD and IID from the database are assigned to the audio signals, which can also be modified with attenuation factors and filters for reproducing the absorption in walls or special real room shapes.

A set of parameters of this nature includes a transfer function for the left ear, a transfer function for the right ear and an interaural delay and interaural level difference for each particular position of the head. In addition to measured real rooms, it is also conceivable to use synthetic spaces generated by a room simulation to construct HRTF databases and therefore to provide exceptional audio perception.

If the HRTFs and the parameters mentioned above for a virtual or a real measured room using the positional data of a headtracker, the impression can be given to a listener with headphones as if the sonic field would be stationary while the listener is moving in the room. This matches the listening impression obtained when moving in a room and listening without headphones.

In addition to the parameters already named for spatial acoustic perception to provide a plausible virtual environment and stable frontal localization for transmission of audio signals through headphones it is known that the rotation of the head—including spontaneous turning—must also be considered (refer, for example, to Philip Mackensen, Klaus Reichenauer and Günther Theile: Effects of spontaneous head rotations on localization for binaural hearing, sound engineers' conference, 1998). Continuous measurement of the position of the head in real time is therefore required, which enables continuous adaptation of the described parameters needed for an authentic aural impression.

It has been proved that this method can eliminate a significant disadvantage of the headphone reception. The known effect of in-head localization no longer occurs and changes in position of the head change the aural impression analogously to the listening perception through loudspeakers. The result is the assurance of natural spatial hearing in a room-referenced virtual sonic field.

A known acoustic headtracker may comprise an arrangement of three ultrasonic transmitters and three ultrasonic receivers. By direct measurement of the propagation time of the ultrasonic signal in the time spectrum the position and alignment of the head in the room is determined. In addition, the measurement range of the rotation of the head is restricted in this case to an angular range of about ±45 degrees. Under ideal conditions, for example, the absence of any noise, an angular range of up to ±90 degrees can be obtained.

Since the measurement of the propagation time of the ultrasonic signals is carried out in the time spectrum, a relatively large amount of technical outlay with fast circuitry is required. Noise signals and reflections overlaying the original test signal can also have negative effects on quality and reliability of the position detection.

An object of the present invention is to provide a method and configuration for acoustic distance measurement and/or localization (by rotational angle) of a head in a sonic field, e.g., a head of a passenger on the rear seat of an automobile, that requires few transmitters and receivers and relatively small computing performance, as well as being insensitive to environmental noise and fluctuations in amplitude, and to reflections in the test signal, and for which the problems described previously do not arise.

SUMMARY OF THE INVENTION

A system for tracking of a head includes a sound signal generator for generating an electrical test signal and two transmitters supplied with different electrical test signals for generating therefrom and radiating acoustical test signals. Two receivers are arranged at the head to be tracked for receiving an acoustical measurement signal which includes the acoustical test signal from the transmitter and providing an electrical measurement signal. An evaluation circuit is connected upstream of the two receivers for determining the position and/or angle of rotation $\phi$ from the measurement signals. The evaluation circuit is adapted to perform a cross power spectrum operation in the frequency domain.

The method for tracking of a head includes generating and radiating at least one acoustical test signal and receiving the radiated acoustical test signal(s) at two locations at the head under investigation and generating electrical measurement signals indicative thereof. The two measurement signals are evaluated to determine the position and/or angle of rotation $\phi$ from the measurement signals. The evaluation step comprises a cross power spectrum operation of the test signal(s) and the signals from the receivers in the frequency domain.

These and other objects, features and advantages of the present invention will become more apparent in light of the following detailed description of preferred embodiments thereof, as illustrated in the accompanying drawings.

DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
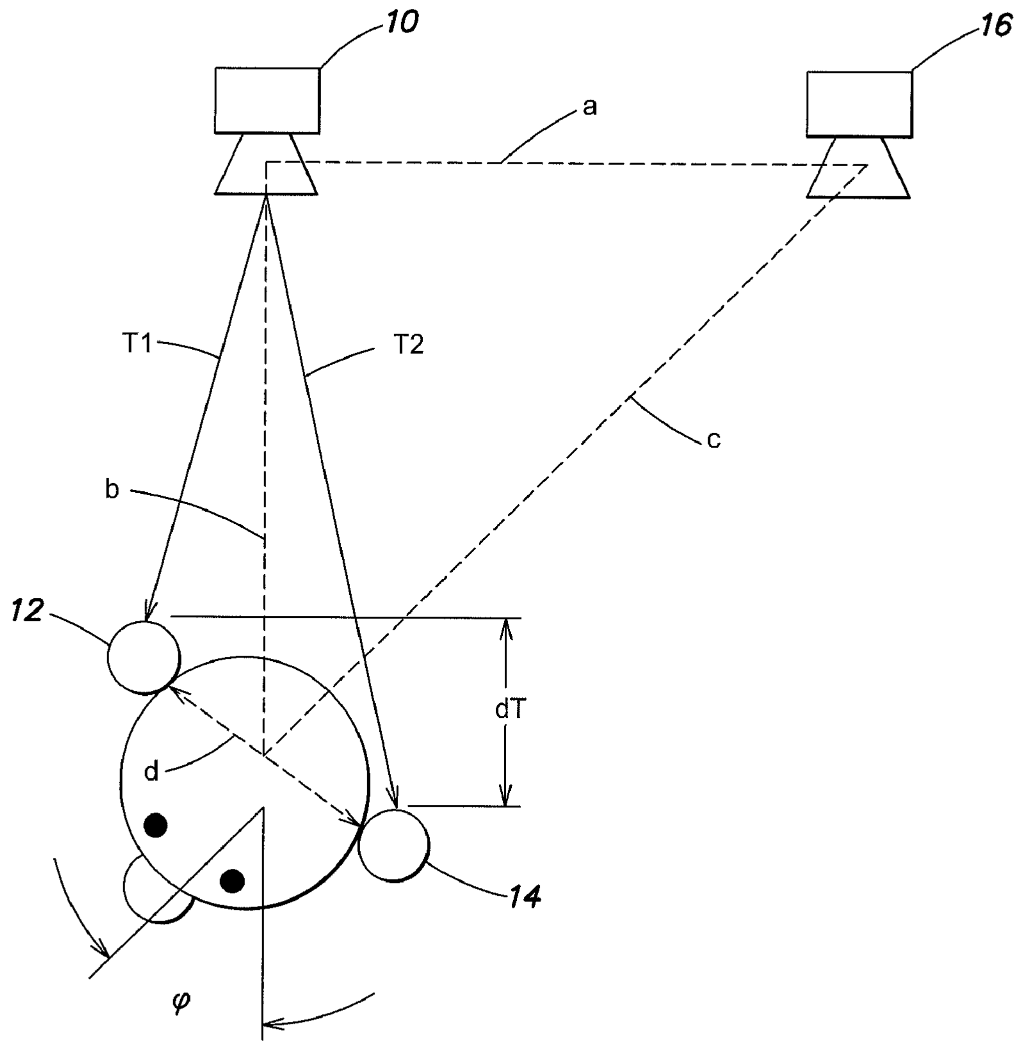
FIG. 1 is a block diagram of a tracking arrangement having a loudspeaker and two microphones.

The arrangement illustrated in FIG. 1 comprises a loudspeaker 10 (e.g., a tweeter), a first microphone 12 secured permanently to headphones (not shown in FIG. 1 for the sake of simplicity), and a second microphone 14 secured permanently to the headphones. The two microphones 12 and 14 are placed at a fixed distance d from each other. The two microphones are preferably positioned symmetrically on a head support bow of the headphones—i.e., laterally shifted by a specified distance from the middle of the headphones' support bow. The reception characteristic curve of the microphones is implemented in such a way that ideally for all realistic positions of the head (determined by the position of the headphone) the test signals emitted by one or more than one laterally mounted loudspeakers can be optimally received.

In FIG. 1, T1 designates the propagation time of the test signal from the respective loudspeaker 10 to the first microphone 12, while T2 designates the propagation time of the same test signal to the second microphone 14 and dT refers to the difference between the propagation times T1 and T2.

It is known that acoustic waves propagate in gaseous media, such as air, with a finite speed. This sonic speed in gases depends on parameters, such as the density, pressure and temperature of the gas. With the exception of soundwaves of a very large amplitude, or so-called impulse waves, the following approximation commonly used defines the sonic speed $c_s$ in air:

$$c_s=(331.15+0.6*T[° C.])\text{m/s}$$

where T refers to the temperature in degrees of Celsius. This formula applies in a temperature range from −20° C. to +40° C. with a precision of greater than 0.2% and is therefore regarded as sufficiently accurate for applications such as acoustic distance measurement. For a generally accepted ambient temperature of 20° C., also commonly known as the room temperature, the typical assumption for $c_s$ is 343 m/s.

If an acoustic signal is transmitted, for example, from a loudspeaker to a sensor (e.g., a microphone) and the time taken for the signal to traverse the path is measured, the distance from the object can be reliably computed from the propagation time and the sonic speed of the signal. However, under real conditions noise signals often arise in addition to a direct acoustic signal during propagation time or distance measurements. Such noise signals have an undesirable effect on the measurement or can falsify the measurement results. These noise signals can be, for example, ambient noises.

In contrast to spatial waves, direct soundwaves refer in the acoustic technology sector to the wavefront in a closed room that is first to reach the test position without experiencing sonic reflections on the way. The arrival of the first wavefront as a direct soundwave is used for calculating the distance traveled by the waves.

To determine the distance of an object or sensor (e.g., a microphone) from the source of the soundwaves for the test signal, a known method is to use the so-called cross-correlation function CCF with a subsequent maximum search in the analysis of the direct soundwave. This method is also referred to as the Maximum Likelihood Method using the first wavefront (see M. Schlang, "Ein Verfahren zur automatischen Ermittlung der Sprecherposition bei Freisprechen"—English language title "A Method for Automatic Determination of a Speaker's Position During Handsfree Communication", ITG Fachbericht 105 "Digitale Sprachverarbeitung", VDE-Verlag, 1989).

The method is employed here to calculate the propagation time by determining the maximum of the enveloping signal of the cross-correlation function. This method is based on the theory that a received (e.g., digitized) signal is correlated with a reference signal received previously in the same manner (generally the transmitted test signal) and the delay in time (i.e., the propagation time between both signals) is determined from the position of the maximum value of the enveloping signal of the cross-correlation function. If the signal x and the time-delayed signal x(t+τ) are available, the maximum value of the cross-correlation function refers to exactly the time delay τ. This method also functions well in practice if one or both signals are noisy, for example, due to noise signals.

The following equation describes the cross-correlation function $R_{xy}(\tau)$ used in the signal analysis to define the correlation of two signals for different time delays τ between the two signals, x(t), the emitted test signal over time t and y(t), the signal received at the sensor over time t:

$$R_{xy}(\tau)=\lim_{T_F\to\infty}\frac{1}{T_F}\int_{-T_F/2}^{T_F/2}x(t)\cdot y(t+\tau)dt$$

The function yields a maximum value for the time delay corresponding to the signal propagation time from the transmission location of the signal x(t) to the reception position of the signal y(t). Here y(t) represents the received signal, including possible noise signals caused, for example, by ambient noise sources.

For signal analyses performed using digital signal processors, such as in the example described here, the cross-correlation function is generally computed using inverse Fourier transformation of the associated cross power spectrum $S_{XY}(f)$ over frequency f:

$$R_{xy}(\tau)=\int_{-\infty}^{\infty}S_{XY}(f)\cdot e^{j2\pi f\tau}df$$

The signal analysis in the frequency spectrum exhibits significant advantages over analysis of acoustic signals in the time spectrum. To avoid incorrect measurements, appropriate actions can be taken against possible susceptibility to noise in uncorrelated noise signals. An example of one of these actions is to repeat the measurement a number of times and then analyze the corresponding results of the propagation time measurements using a median filter. This method enables possible incorrect measurements marked by deviations from the average propagation time to be detected and then removed from the full set of measurements. In this way, reliable measurement results can be obtained even if uncorrelated noise signals occur at the same time, such as ambient noises that are unrelated to the test signal.

As shown in FIG. 1, a test signal described further below is emitted from the first loudspeaker 10. This test signal arrives after a propagation time T1 at the first microphone 12 and arrives time-delayed by a time difference dT at the second microphone 14 after a propagation time T2. The time difference dT is calculated as follows:

$$dT=T2-T1$$

The propagation times T1 and T2 may be determined using the cross-correlation function (CCF). The electric and digitized signal for generating the test signal through the first loudspeaker 10 is cross-correlated with the signals at the microphones 12 and 14. The propagation times T1 and T2 are calculated based on the maximum values of the corresponding cross-correlation function.

The associated rotation angle φ may be calculated according to the following formula:

$$\phi=\arctan(dT/(d/c_s))$$

where d refers to the distance between the two microphones 12 and 14 as marked in FIG. 1, and $c_s$ the sonic speed.

The rotation angle $\phi$ is calculated in this way in a range of $\pm\pi/2$ corresponding to ±90 degrees. The value $\phi=0$ degrees is reached once the loudspeaker emitting the test signal is vertical along one axis and transmits the test signal in the middle of the conceived distance line d (see the respective dotted line in FIG. 1) between the microphones 12, 14 directly facing the two microphones, so that T1=T2 and dT=0. For values of the rotation angle $\phi$ greater than ±90 degrees, a simple arrangement having only one loudspeaker is not definite because there are two mirrored positions of the two microphones in reference to an angular rotation range of 360 degrees in each case, for which times T1 and T2 have identical values.

Furthermore, the measurement configuration having only one loudspeaker cannot be used to clearly determine the position of the head. The acoustic propagation time measurement with just one audio source only provides information on how far a sensor for receiving the test signal is away from the source. Theoretically, a sensor of this kind is located on any point of a spherical surface whose center is the audio source of the test signal. The radius of this spherical surface is determined by the propagation time.

However, in an automotive application, the set of possible positional points is however restricted by the limited number of possible positions of the listener relative to the audio source, namely of the loudspeaker 10. This restriction is due to the spatial restriction imposed by the passenger compartment of the automobile and also by the fact that the listener is on the rear seat of the car. This information is also used later to select a suitable plane for the two-dimensional localization.

It is known that the so-called triangulation method is required for two-dimensional localization in a plane. A second, independent, e.g., orthogonal or different frequencies test signal transmitted from a second source, e.g., loudspeaker 16 in FIG. 1, separated at a known distance a from the first source (loudspeaker 10) is needed for this purpose wherein a distance c with regard to the second loudspeaker 16 is obtained in the same way as distance b with regard to the first loudspeaker 10. Three-dimensional triangulation using a third, independent source for the test signal at a known distance from the first and second sources is required for precise localization in the three-dimensional space. However, only two-dimensional triangulation is needed in automotive applications since the position of the passenger is restricted to a relatively small area.

It can be seen that the signals needed for determining the position and rotation of the headtracker are not permitted to interfere with the audio signals emitted through loudspeakers. Therefore, test signals are used whose frequencies are higher than the frequency range audible to the human ear. The maximum perceptible upper frequency is generally assumed to be no higher than 20 kHz. Nonetheless, these test signals must be relayed without distortion and with an adequate level by the loudspeakers (e.g., tweeters) installed in the automobile. For this reason, the range (just) above 20 kHz may be selected for the test signal frequencies. In this way the headtracking is inaudible to the human ear but is deployed using loudspeakers already installed as part of the rear seat entertainment configuration.

Moreover, choosing this frequency range for the test signals also allows the loudspeakers to be easily used to emit audio signals, such as music, for passengers in the automobile without headphones, particularly the tweeters. The analysis of the test signals by cross-correlation is sufficiently selective so that audio signal frequencies of up to about 20 kHz do not corrupt the measurement. Reflections of the test signal, which are typical in an automobile, are likewise strongly suppressed through use of the cross-correlation function. Owing to its high level of selectivity, the cross-correlation function is also very insusceptible to possible fluctuations in signal amplitude, which can occur due to obstruction of the test signal by other persons in the automobile.

As described above, all possible positions of the headtracker are provided by the dimensions of the passenger compartment in the rear seat area. As a result, the maximum propagation time of the test signal from a loudspeaker to the microphone on the headphones can be calculated for a given automobile and known position of the tweeters. For example, if a maximum possible distance of two meters between the loudspeaker and the microphone on the headphones is assumed for a very spacious vehicle, the maximum propagation time is calculated using the known sonic speed c as almost 6 milliseconds. The maximum time $\tau$ of the time delay can then be calculated using the cross-correlation function. The computing effort required in the digital signal processor for the signal analysis in this case can be correspondingly restricted.

It may be also useful to adapt the repeat frequency of the transmitted test signals to the same maximum possible propagation time in such a way that it is ensured that only one test impulse is sent within this period. This guarantees that the cross-correlation function between the transmitted test signal and received signal only has one reliably calculable maximum value for the duration of the maximum propagation time.

The assumptions given above correspond to a repeat frequency of the test signal of about 172 Hz. This also defines the maximum possible refresh rate of the applied HRTFs, ITDs and IIDs for producing the virtual spatial aural impression for relay through headphones. If the cross-correlation between the transmitted test signal and received signal is restricted to the specified time, none of the reflections of the test signal in the automobile interior that corrupt the analysis results are included that typically have a longer propagation time to the microphone than the direct wavefront of the test signal.

In another example, the music signal emitted through the loudspeakers can also be used itself as the test signal. The auto correlation function also serves in this case as a suitable method to calculate distances from a test signal of this kind, and therefore to determine the location and position of a headtracker.

To successfully use HRTFs, not only is the rotational angle of the headphones in the sonic field essential as described above, but also the position of the headphones in the sonic field. The measurement configuration shown in FIG. 1 is therefore extended by a second equivalent measurement configuration whose source for the second independent test signal is the second tweeter 16, which is used to obtain the spatial impression of audio signals.

As mentioned above, the triangulation method can be used to determine the spatial position of the headtracker. The requirement for this is that a suitable plane be defined from the possible set of planes given by the spatial position of the two tweeters.

It is known that the anatomic dimensions of a standard-sized person are typically used for optimization of the interior characteristics of automobiles and also for optimization of the sonic field (without headphones) for rear seat entertainment in automobiles. For example, an average height of 177 cm is assumed. Since the positioning and distance of the tweeters are known for a given automobile, usually as well as the seat height in the rear compartment, the expected plane in which the position of the headtracker has to be determined can be defined with sufficient accuracy. Depending on the positioning of the tweeters, this plane must not necessarily be a horizontal plane.

Slight deviations in the actual position in relation to the assumed plane play a negligible role for the use of the HRTFs in comparison to the adopted angle of rotation in the sonic field and spontaneous movements of the head, which have far greater effects on the aural impression in a sonic field. Consequently, for an assumed plane, a sufficiently accurate position of the headtracker can be determined with just two loudspeakers (e.g., tweeters).

The use of a second source for a second independent test signal also facilitates the exact calculation of the angle of rotation in a range of 360 degrees. The independence of the two test signal sources is achieved in the invention by emitting the test signals from the two loudspeakers at different frequencies—for example, at 21 kHz and 22 kHz. In ideal situations, the two signals should have an autocorrelation function value of zero. To achieve this, so-called perfect sequences are used to generate the test signals, for example. Perfect sequences are characterized by their periodic autocorrelation functions, which assume the value zero for all values of a time delay not equal to zero—i.e., for autocorrelation values of zero there is no dependency on delayed values.

The term "autocorrelation function" is usually referred to in signal analysis as the autocovariance function. Here the autocorrelation function is employed to describe the correlation of a signal with itself for different time delays $\tau$ between the observed function values. For example, the function $R_{xx}(\tau)$ is defined as follows for the time signal x(t):

$$R_{xx}(\tau) = \lim_{T_F \to \infty} \frac{1}{T_F} \int_{-T_F/2}^{T_F/2} x(t) \cdot x(t+\tau) dt$$

If the signal contains repetitions, the autocorrelation function yields maximum values for the delays that correspond to the duration of the repetitions in the signal. Periodic components and echoes, for example, can be detected in the signal in this way. In signal analyses carried out using digital signal processors, such as in the case explained here, the autocorrelation function is generally calculated using the inverse Fourier transformation of the associated cross performance $S_{XX}(f)$ spectrum over frequency f as follows:

$$R_{xx}(\tau) = \int_{-\infty}^{\infty} S_{XX}(f) \cdot e^{j2\pi f\tau} df$$

Figure 2:
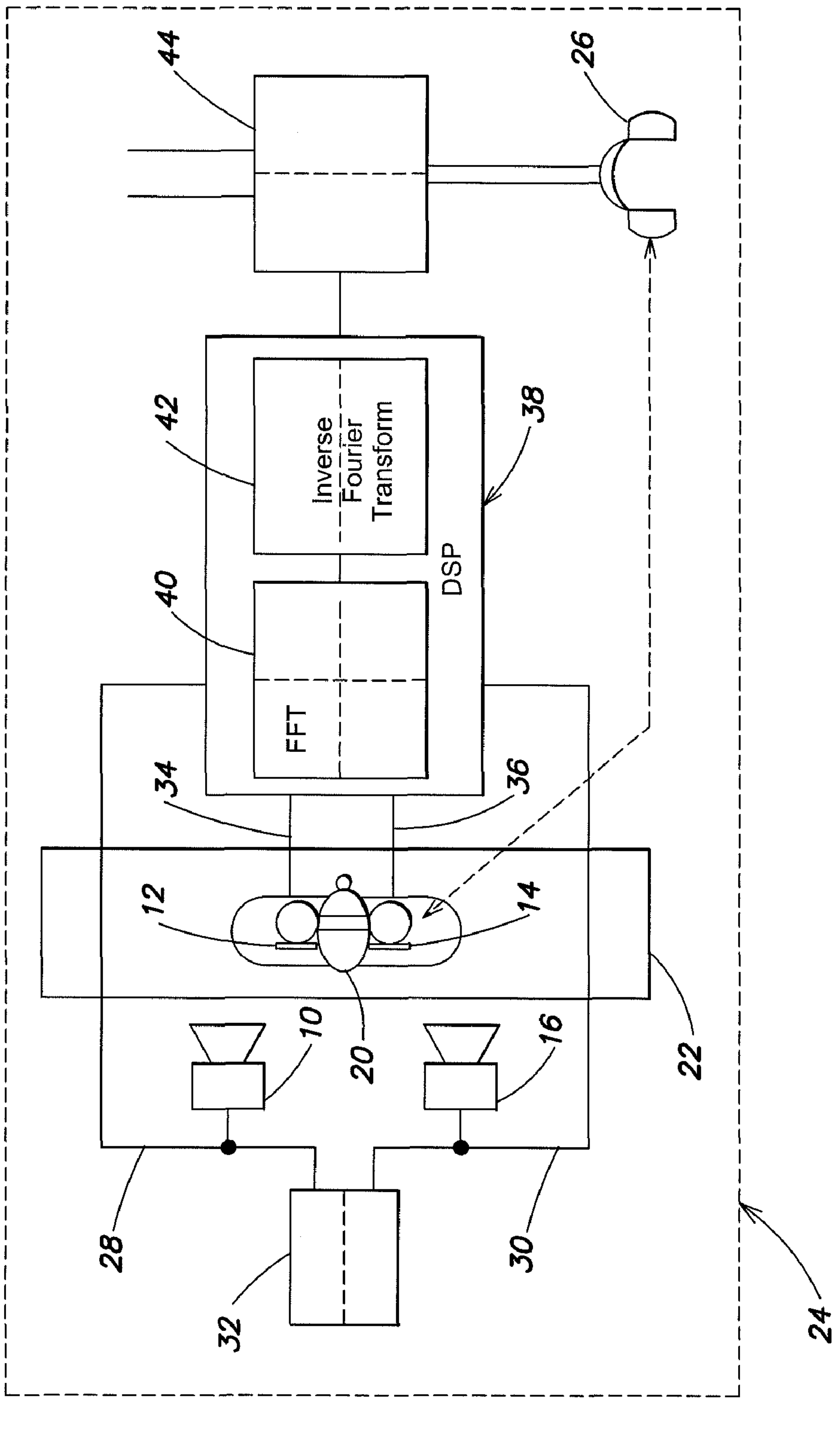
FIG. 2 is the circuit diagram of the tracking arrangement of FIG. 1.

FIG. 2 illustrates an example of a system for tracking the head of a passenger 20 sitting on a rear seat 22 of a passenger compartment 24 of an automobile. The passenger 20 is wearing a headphone 26 on which the first and second microphones 12, 14 are mounted. For the sake of clarity with regard to the signal flow, the headphones 26 and the microphones 12, 14 are shown separately in FIG. 2 although they are basically in the same position, namely at the rear seat position. Behind the passenger 20 the two loudspeakers 10, 16 are located which are supplied with first and second test signals on lines 28, 30, respectively, from test signal generator 32 wherein the first and second test signals have different frequencies in a non-audible human frequency range.

The two microphones 12 and 14 receive the signals radiated by the two loudspeakers together with noise signals present in the passenger compartment 24 and generate measurement signals provided on lines 34, 36 respectively. The measurement signals are supplied to a digital signal processor 38 that includes a circuit 40 which—under appropriate software control—calculates the cross power spectra of the two measurement signals on the lines 34, 36. The digital signal processor 38 may further include a circuit 42 which—again under appropriate software control—calculates the inverse (Fast) Fourier Transformation to transform the cross power spectra back from the frequency domain into the time domain resulting in respective cross correlation functions.

Accordingly, the circuit 40 may include a FFT for transforming the two measurement signals on the lines 34, 36 from the time domain into the frequency domain. The digital signal processor 38 may also perform the triangulation calculations leading to control signals for a sound processor unit 44. The sound processor unit 44 processes sound signals from a signal source (e.g., CD, DVD, radio, television sound, etc.) in accordance with the control signals from the digital signal processor so that movements of the head result into appropriate changes of the sound perceived by the listener who wears the headphones 26 connected to the sound processor unit 44. The sound processor unit may be implemented as a stand alone unit (as shown) but may also be implemented in a digital signal processor, in particular the digital signal processor 38.

Figure 3:
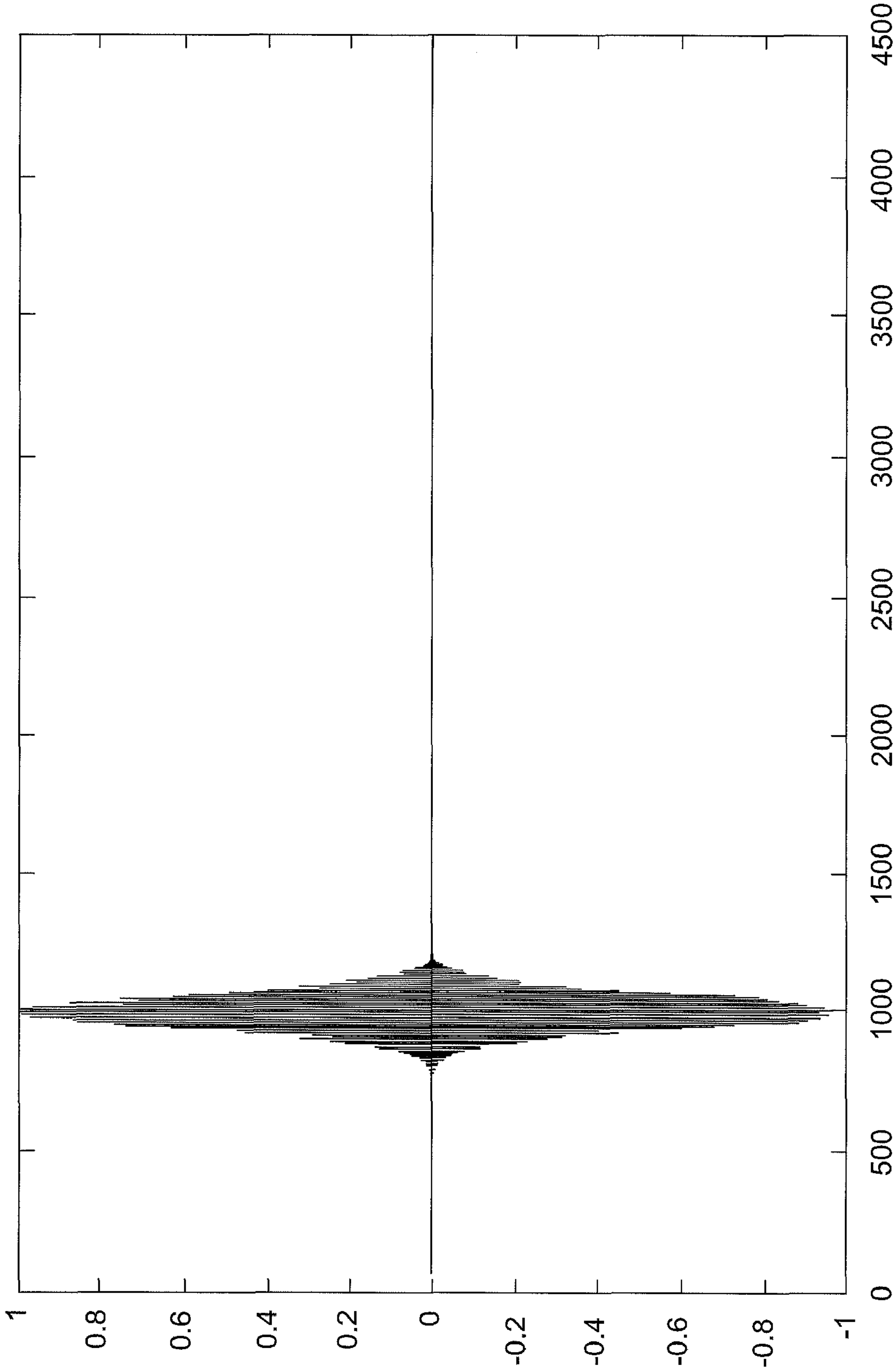
FIG. 3 is a diagram illustrating the amplitude of an excitation signal of a loudspeaker over time.

FIG. 3 illustrates an example of a first excitation signal A1 for the first loudspeaker 10 of FIG. 1 with a frequency of 21 kHz, which sufficiently satisfies the above requirements. The signal can be defined as follows:

$$A1=\sin(2\cdot\pi\cdot 21\text{ kHz}\cdot t)\cdot e^{-((T-t)\cdot\alpha)^2}$$

Analogously, a second excitation signal A2 for the second loudspeaker 16 is defined as follows:

$$A2=\sin(2\cdot\pi\cdot 22\text{ kHz}\cdot t)\cdot e^{-((T-t)\cdot\alpha)^2}$$

FIG. 3 shows the characteristic of the impulse of the first excitation signal A1 with a bell-shaped (e.g., Gaussian) envelope curve and a fundamental frequency of 21 kHz, for which the level is linear over the measured time. The second excitation signal A2 is similarly represented, but with a frequency of 22 kHz. $\alpha$ is selected to be, e.g., 500 for both signals. Parameter $\alpha$ defines that the two signals do not overlap in the frequency spectrum, and therefore exhibit a minimum cross-correlation value. The signal analysis can therefore clearly distinguish between the test signals of the two signal sources 10, 16.

Figure 4:
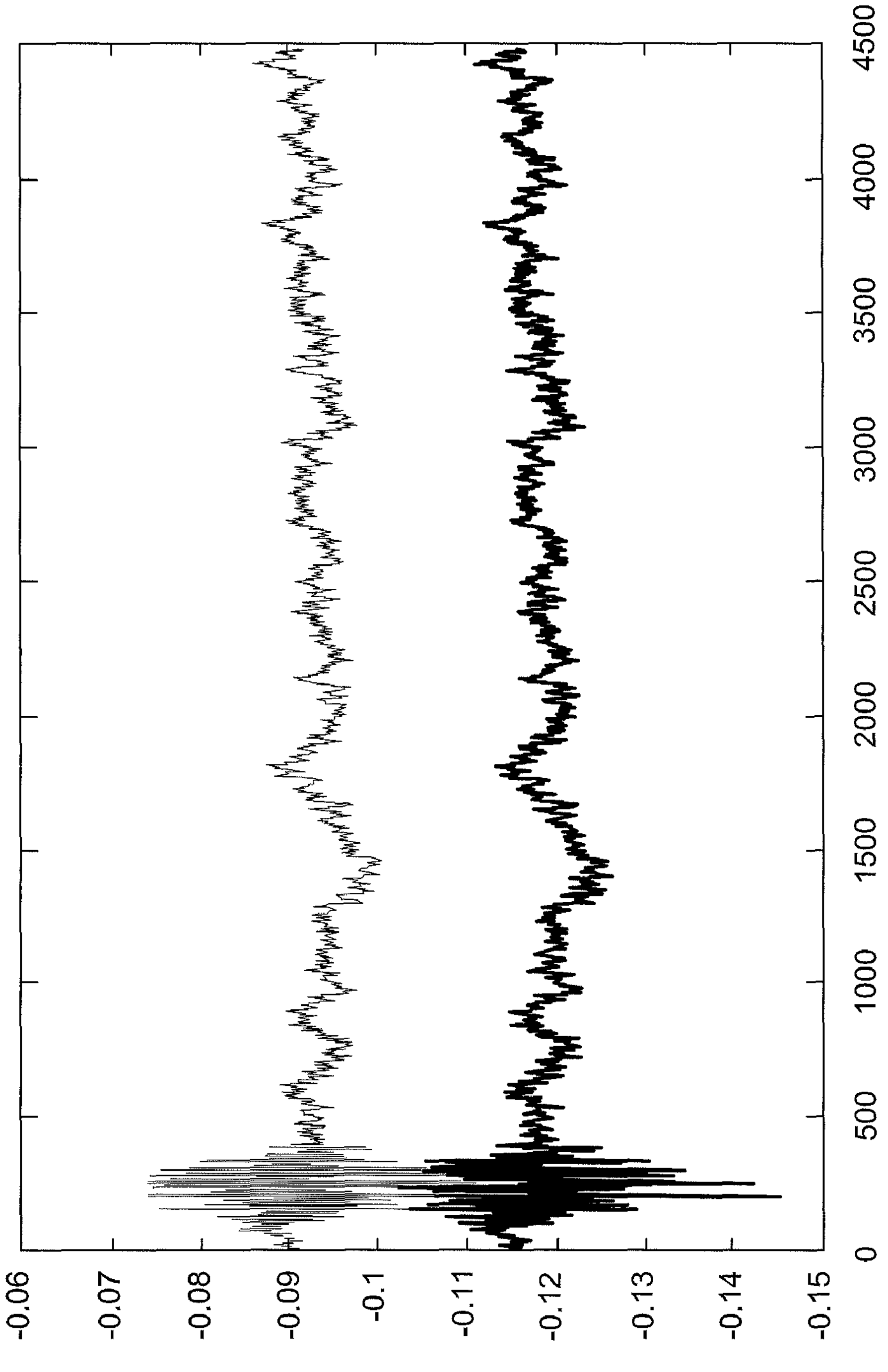
FIG. 4 is a diagram illustrating the incoming signals of the microphones in the time domain.

FIG. 4 shows the signal characteristics for the microphones 12, 14 as measured for an incoming impulse. The sound pressure level of the measured signal is imposed linearly over time in the figure.

Figure 5:
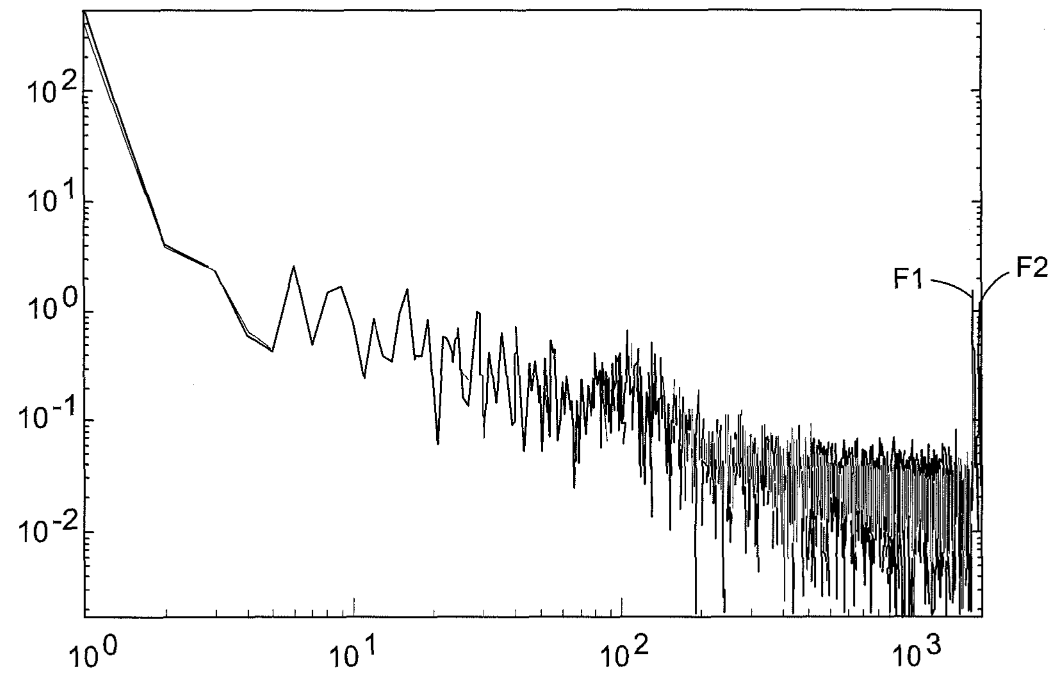
FIG. 5 is a diagram illustrating one of the incoming microphone signals of FIG. 4 in the frequency domain.

As explained earlier, analysis of the signals may be carried out in the frequency spectrum and the specific advantages of the cross-correlation method are used. FIG. 5 shows the spectrum for the two test signals with different frequencies generated through a Fast Fourier Transformation (FFT). The two clearly separated maximum values F1 and F2 of the Fourier transformation can be easily seen. The level over frequency is shown in logarithmic form in FIG. 5.

Figure 6:
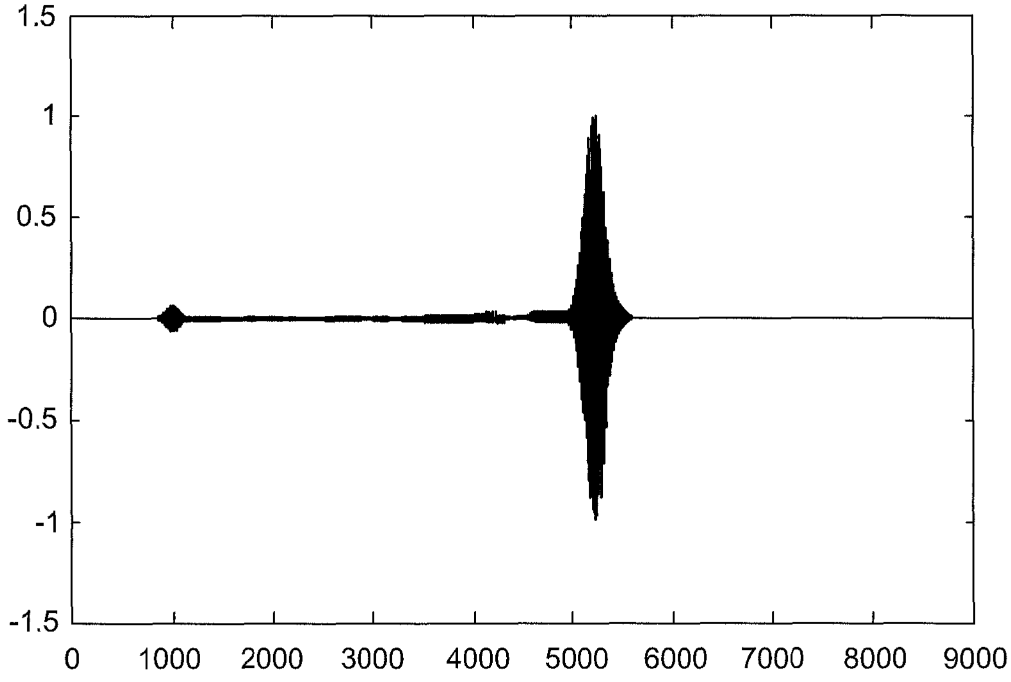
FIG. 6 is a diagram illustrating the cross-correlation signal from the excitation signal and the microphone signal.

FIG. 6 shows the cross-correlation between the test signal from the loudspeaker and the signal received at the microphone. As explained further above, the advantages of the cross-correlation method can be clearly discerned. A single, clear maximum value of the cross-correlation function is obtained. The propagation time of the signal, and therefore the distance of the microphone from the audio source (e.g., the tweeter in the rear seat entertainment audio system), can be determined. FIG. 6 shows a linear representation of the result of the cross-correlation over the delay of the two signals of the loudspeaker and microphone. When using this method the amplitude of the maximum value of the cross-correlation function can likewise be evaluated as a measure of the quality of the correlation between the loudspeaker and microphone signals. Further, a sufficiently accurate triangulation is achieved by predefinition of the plane using standard dimensions. The longer the cross correlations is, the better the signal-to-noise ratio and the slower the tracking time.

Accordingly, advantages are derived from the analysis of the test signals in the frequency range, which provides considerably greater resistance to interference in addition to cost benefits for the necessary analysis circuit in comparison to analyses of very fast ultrasonic signals in the time spectrum.

Another advantageous effect of the invention is the option to reduce the number of transmitters and receivers for the test signal. Advantage is taken of the fact that the loudspeakers, e.g., the tweeters, typically installed for the rear seats of an automobile as a series feature can be used as transmitters for the acoustic test signal, and therefore no additional transmitters are required for the measurement arrangement. The frequency range of the test signals is selected in this case in such a way that although the signals can be relayed by the tweeters distortion-free and at a sufficient level they are also beyond the range of frequencies audible to the human ear and thus do not impair the aural perception of audio signals emitted through the loudspeakers.

Although various examples to realize the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

What is claimed is:

1. A system for tracking of a head comprising:

a signal generator for generating a test signal;

a first loudspeaker that receives the test signal and generates and radiates a first acoustical test signal;

first and second audio receivers arranged spatially separated at the head to be tracked for receiving the acoustical test signal and providing first and second electrical measurement signals indicative thereof, respectively; and an evaluation circuit that receives and processes the first and second electrical measurement signals and determines the position and angle of rotation $\phi$ from the first and second measurement signals, where the evaluation circuit is adapted to perform, in the frequency domain, a cross power spectrum operation of the test signal and the first and second electrical measurement signals from the receivers.

2. The system of claim 1, where the loudspeaker is part of a sound system in a passenger compartment of an automobile.

3. The system of claim 2, where the loudspeaker is located in the rear part of the passenger cell.

4. The system of claim 3, where the position of the head under investigation is restricted by a defined seating area within the passenger compartment.

5. The system of claim 1, where the test signal is in frequency ranges inaudible to the human ear.

6. The system of claim 1, comprising a second loudspeaker that radiates a second acoustical test signal in a frequency different than the first loudspeaker.

7. The system of claim 1, where the acoustical test signal is a sonic impulse(s) with a bell-shaped enveloped curve.

8. The system of claim 6, where the first and second acoustical test signals exhibit a cross-correlation function approximating zero.

9. The system of claim 6, where the first and second acoustical test signals exhibit an auto-correlation function approximating zero.

10. The system of claim 2, where the first loudspeaker is a part of an audio system of the automobile.

11. The system of claim 6, wherein the position of the head is determined in the evaluation circuit by two-dimensional triangulation of the distances of the head from the first and second loudspeakers and the distance between the first and second loudspeakers in connection with a spatial definition of a plane in the sonic field.

12. The system of claim 11, where the spatial definition of the positioning plane in the sonic field is based on standard dimensions used in the automobile industry for passengers in the passenger areas of automobiles.

13. The system of claim 11, where the rotational angle $\phi$ is determined in the evaluation circuit from the $\phi=\arctan(dT/(d/c_s))$, where d is the distance between the first and second loudspeakers, $c_s$ the sonic speed, and dT the time difference of the propagation times between one of the loudspeakers and the first and second audio receivers.

14. The system of claim 1, where propagation time between the loudspeaker and one of the audio receivers is determined in the evaluation circuit by determining the cross-correlation of the respective test signal and the signal from the respective receiver, the cross-correlation is derived from the cross power spectrum.

15. The system of claim 14, where the evaluation circuit is adapted to perform a time-to-frequency transformation.

16. The system of claim 15, where the evaluation circuit is adapted to perform a frequency-to-time transformation.

17. The system of claim 1, where the first and second audio receivers are arranged on a headphone worn on the head of a person in the passenger compartment of the automobile.

18. The system of claim 17, where the evaluation circuit comprises a digital signal processor.

19. A method for tracking of a head of an occupant in a passenger compartment of a motor vehicle comprising:

radiating at least one acoustical test signal;

receiving the radiated acoustical test signal(s) at two locations at the head of the occupant under investigation and generating first and second electrical measurement signals indicative thereof; and evaluating the first and second measurement signals to determine the position and/or angle of rotation $\phi$ of the head of the occupant by computing a cross power spectrum operation of the test signal and the first and second electrical measurement in the frequency domain.

20. The method of claim 19, where the position of the head under investigation is restricted to a predetermined area.

21. The method of claim 20, where the test signal(s) is/are in frequency ranges inaudible to the human ear.

22. The method of claim 20, where two test signals are provided and wherein the test signals have different frequencies.

23. The method of claim 22, where the test signals are sonic impulses with a bell-shaped enveloped curve.

24. The method of claim 19, where two test signals are provided and wherein the test signals exhibit a cross-correlation function approximating zero.

25. The method of claim 19, where two test signals are provided and wherein the test signals exhibit an auto-correlation function approximating zero.

26. The method of claim 19, where two test signals are provided by two transmitters and wherein the position of the head is determined in the evaluation circuit by two-dimensional triangulation of the distances of the head from the transmitters and the distance between the transmitters in connection with a spatial definition of a plane in the sonic field.

27. The method of claim 26, where the spatial definition of the positioning plane in the sonic field is based on standard dimensions used in the automobile industry for passengers in the passenger areas of automobiles.

28. The method of claim 26, where the rotational angle $\phi$ is determined in the evaluation circuit from the $\phi=\arctan(dT/(d/c_s))$, where d is the distance between the two receivers, $c_s$ the sonic speed, and dT the time difference of the propagation times between one of the transmitters and the two receivers.

29. The method of claim 28, where the propagation time between one of the transmitters and one of the receivers is determined in the evaluation circuit by determining the cross-correlation of the respective test signal and the signal from the respective receiver; the cross-correlation is derived from the cross power spectrum.

30. The method of claim 19, where the evaluation step is adapted to perform a time-frequency transformation.

31. The method of claim 19, where the evaluation circuit comprises the step of performing a frequency-time transformation.

32. An audio system with headphones supplied with a signal from a sound processor for adapting the sound of an input sound signal to the position of a head wearing the headphones, the sound processor being controlled by control signals for tracking of the head, the unit for tracking of a head comprises:

a sound signal generator for generating an electrical test signal;

at least one transmitter supplied with a test signal for generating therefrom and radiating an acoustical test signal;

two receivers arranged at the head to be tracked for receiving an acoustical measurement signal which includes the acoustical test signal from the transmitter and providing an electrical measurement signal; and an evaluation circuit connected upstream of the two receivers for determining the position and/or angle of rotation $\phi$ from the measurement signals, where the evaluation circuit is adapted to perform, in the frequency domain, a cross power spectrum operation of the test signal(s) and the signals from the receivers.

* * * * *